United States Patent
Ishida et al.

(10) Patent No.: US 9,571,193 B2
(45) Date of Patent: Feb. 14, 2017

(54) TRANSMITTER, RECEIVER, AND METHOD

(71) Applicant: NTT DOCOMO, INC., Chiyoda-ku (JP)

(72) Inventors: Masanori Ishida, Chiyoda-ku (JP); Kouki Hayashi, Chiyoda-ku (JP); Kunio Yoshikawa, Chiyoda-Ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 85 days.

(21) Appl. No.: 14/354,764

(22) PCT Filed: Nov. 20, 2012

(86) PCT No.: PCT/JP2012/080102
§ 371 (c)(1),
(2) Date: Apr. 28, 2014

(87) PCT Pub. No.: WO2013/077334
PCT Pub. Date: May 30, 2013

(65) Prior Publication Data
US 2014/0241732 A1    Aug. 28, 2014

(30) Foreign Application Priority Data

Nov. 25, 2011    (JP) .................................. 2011-257798

(51) Int. Cl.
*H04B 10/116*    (2013.01)
*H04M 1/725*    (2006.01)
(Continued)

(52) U.S. Cl.
CPC ........... *H04B 10/116* (2013.01); *G09G 3/2003* (2013.01); *H04B 10/506* (2013.01);
(Continued)

(58) Field of Classification Search
CPC ............ G09G 3/2003; H04M 1/72544; H04M 2250/52; H04M 2250/06; H04B 10/116; H04B 10/506; H04B 10/66; H04N 5/66
See application file for complete search history.

(56) References Cited

U.S. PATENT DOCUMENTS

2002/0118210 A1 * 8/2002 Yuasa .................. H04N 1/6052
345/589
2005/0254714 A1    11/2005 Anne
(Continued)

FOREIGN PATENT DOCUMENTS

JP    9 233025    9/1997
JP    2005 136665    5/2005

OTHER PUBLICATIONS

Combined Chinese Office Action and Search Report issued Aug. 17, 2015 in Patent Application No. 201280056991.4 (with English language translation).
(Continued)

*Primary Examiner* — Sahlu Okebato
(74) *Attorney, Agent, or Firm* — Oblon, McClelland, Maier & Neustadt, L.L.P.

(57) ABSTRACT

A feature of the present invention pertains to a transmitter for transmitting data by video, the transmitter including a transmission data control unit that distributes the data to multiple colors constituting the video, and a display unit that converts the distributed data into a sequence of a predetermined color value with respect to each of the multiple colors and lighting the multiple colors in a communication area on a display in accordance with the sequence of the color value.

6 Claims, 8 Drawing Sheets

(51) Int. Cl.
  *H04B 10/50* (2013.01)
  *H04B 10/66* (2013.01)
  *H04N 5/30* (2006.01)
  *H04N 5/66* (2006.01)
  *G09G 3/20* (2006.01)

(52) U.S. Cl.
  CPC .......... *H04B 10/66* (2013.01); *H04M 1/7253* (2013.01); *H04M 1/72544* (2013.01); *H04N 5/30* (2013.01); *H04N 5/66* (2013.01); *H04M 2250/52* (2013.01); *H04M 2250/64* (2013.01)

(56) References Cited

U.S. PATENT DOCUMENTS

2006/0256070 A1* 11/2006 Moosavi ............ H04B 10/1141
          345/104
2009/0002265 A1*  1/2009 Kitaoka ................ G09G 3/003
          345/4

OTHER PUBLICATIONS

Combined Office Action and Search Report issued Jan. 14, 2015 in Chinese Patent Application No. 201280056991.4 (with English language translation).
International Search Report Issued Dec. 18, 2012 in PCT/JP12/080102 Filed Nov. 20, 2012.
Extended European Search Report issued Jul. 10, 2015 in Patent Application No. 12851433.8.
Chinese Office Action dated Mar. 31, 2016, issued in Chinese Patent Application No. 201280056991.4 (with English translation).
Chinese Office Action mailed Oct. 17, 2016 issued with respect to corresponding Chinese Patent Application No. 201280056991.4, (33 pages).

* cited by examiner

FIG.8

| FRAME RATE | COLORS FOR INFORMATION TRANSMISSION | SAMPLE RATE | MODULATION SCHEME | MODULATION LEVEL | BIT RATE [bps] | IPv4 ADDRESS (32bit) TRANSMISSION TIME |
|---|---|---|---|---|---|---|
| 30fps | 1 COLOR | 2 SAMPLE/BIT | ON/OFF | 2-VALUE | 15 | 2.13 |
| 30fps | 2 COLORS | 2 SAMPLE/BIT | ON/OFF | 2-VALUE | 30 | 1.07 |
| 30fps | 3 COLORS | 2 SAMPLE/BIT | ON/OFF | 2-VALUE | 45 | 0.71 |
| 30fps | 3 COLORS | 2 SAMPLE/BIT | ON/OFF | 4-VALUE | 90 | 0.36 |
| 30fps | 2 COLORS | 4 SAMPLE/BIT | ON/OFF | 4-VALUE | 30 | 1.07 |

US 9,571,193 B2

TRANSMITTER, RECEIVER, AND METHOD

TECHNICAL FIELD

The present invention relates to a transmitter, a receiver, and a method for transmitting information via a screen.

BACKGROUND ART

Typically, an infrared communication function is used for exchanging profile information (e.g., telephone number, e-mail address) between portable terminals. However, in a case where one of these portable terminals is not equipped with the infrared communication function, profile information cannot be exchanged by using the infrared communication function. In this case, there is a method for obtaining profile information by displaying a QR code (registered trademark) recorded with profile data on a screen of one portable terminal and reading out the displayed QR code (registered trademark) with a camera of the other portable terminal.

SUMMARY OF THE INVENTION

Problem to be Solved by the Invention

However, the method of using the QR code (registered trademark) has problems such as requiring accurate focusing of the camera, being susceptible to shaking of the camera, and having a limited recognizable read angle.

In view of the aforementioned problems, an object of the present invention is to provide a transmitter, a receiver, and a method for transmitting information by using a camera image displayed on a screen.

Means for Solving the Problem

In order to solve the aforementioned problems, a feature of the present invention pertains to a transmitter for transmitting data by video, the transmitter including a transmission data control unit that distributes the data to multiple colors constituting the video, and a display unit that converts the distributed data into a sequence of a predetermined color value with respect to each of the multiple colors and lighting the multiple colors in a communication area on a display in accordance with the sequence of the color value.

Effect of the Present Invention

With the present invention, as long it is an apparatus equipped with a screen, there can be provided a transmitter, a receiver, and a method that can transmit information by using a color image displayed on a screen without relying on other communication units.

BRIEF DESCRIPTION OF THE DRAWINGS

FIG. 8 is a diagram illustrating an effect according to an embodiment of present invention.

EMBODIMENTS FOR CARRYING OUT THE INVENTION

Next, embodiments of the present invention are described based on the accompanying drawings.

According to the embodiments described below, in order to transmit data from a transmitter to a receiver, the transmitter allocates data (target transmission data) to multiple colors, converts the allocated data into sequences of color values, and displays a video according to the converted sequences of the color values of each color. The receiver captures the display of the transmitter with an image capturing unit such as a camera, obtains the sequences of the color values of each color from the captured video, and obtains data by performing decoding and combining on the obtained sequences of the color values of each color. Although the transmitter and receiver are typically portable apparatuses, the present invention is not limited to these apparatuses. In other words, the transmitter may be any suitable apparatus that can transmit target transmission data via a video displayed on a display. For example, the transmitter may be a desktop computer or a public display device. Further, the receiver may be any suitable apparatus that can capture the video displayed on the display of the transmitter and obtain the target transmission data from the captured video.

Figure 1:
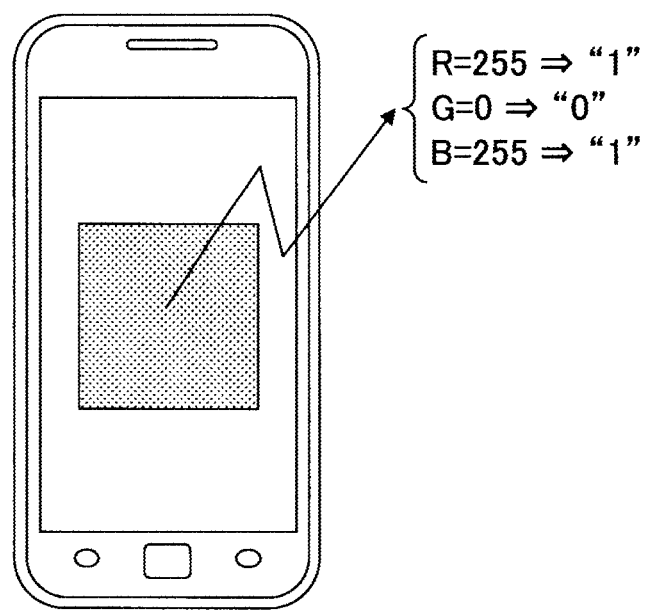
FIG. 1 is a diagram illustrating a transmission image according to an embodiment of the present invention.

An example of transmitting information with a color image according to an embodiment of the present invention is described with reference to FIG. 1. FIG. 1 is a diagram illustrating a transmission image according to an embodiment of the present invention.

As illustrated in FIG. 1, a color image, which is generated by allocating data to each of three primary colors of RGB, is displayed on a screen of a transmitter. The illustrated transmission image is an image generated by allocating 3 primary colors to corresponding color values of R=255, G=0, and B=255. In a case where a binary value "1" is allocated to the color value "255" and a binary value "0" is allocated to the color value "0", the illustrated transmission image can be transmitted as 3 bit data "101". Thus, by displaying a video of one or more of encoded transmission images at predetermined intervals or a frame rate, 3 bit information can be transmitted in correspondence with each display frame. The receiver can capture the displayed transmission image by using an image capturing unit such as a built-in camera and obtain information from the captured transmission image.

It is to be noted that, although two color values "255" and "0" are used for each primary color in the illustrated transmission image, a multi-value modulation method using more color values may be used. For example, 4 color values "255", "170", "85", and "0" may be used, so that the color value "255" is allocated to a binary value "11", the color value "170" is allocated to a binary value "10", the color value "85" is allocated to a binary value "01", and the color value "0" is allocated to a binary value "00". In this case, 6 bit information can be transmitted with a single transmission image by using the three primary colors of RGB.

In the embodiments below, the present invention is described by using an RGB method. However, the present invention is not limited to the RGB method, and other suitable display methods that can display multiple colors may be used.

In the above-described embodiments, two or four color values of "255", "170", "85", and "0" are used as predetermined color values with respect to each color of RGB. However, the present invention is not limited to these embodiments. For example, the color values that are used may be changed in correspondence with the environment in which the transmitter and receiver are positioned. For example, in a case where the transmitter and the receiver are positioned in a dark environment, the use of a color value of a dark color may be avoided. Thus, a color image can be captured with higher precision by dynamically allocating the color values to be used in correspondence with the environment.

The transmitter and/or the receiver of the below-described embodiments is typically a portable data terminal such as a mobile phone or a smartphone. The transmitter is an apparatus that can display target transmission data on a display by using an application installed therein. The receiver is an apparatus that can capture an image of the display of the transmitter by using an application installed therein and an image capturing unit. Typically, the transmitter and/or the receiver includes one or more various hardware resources such as an auxiliary storage apparatus, a memory apparatus, a CPU (Central Processing Unit), a communication apparatus, a display apparatus, an input apparatus, and an image capturing apparatus. The auxiliary storage apparatus includes, for example, a hard disk or a flash memory. The auxiliary storage apparatus stores a program or data for implementing the various processes described below. The memory apparatus includes, for example, a RAM (Random Access Memory). In a case where activation of a program is instructed, the memory apparatus reads out the program from the auxiliary storage apparatus and stores the program therein. The CPU functions as a processor that processes information. The CPU implements various functions described below according to the program stored in the memory apparatus. The communication apparatus includes various communication circuits for performing wired and/or wireless communication with another apparatus (e.g., server) via a network. The display apparatus includes various displays such as an LED display or an organic EL display. The display apparatus displays various information. Typically, the input apparatus includes, for example, an operation button, a keyboard, and a mouse. The input apparatus used for inputting various operating instructions from a user of a mobile terminal. Typically, the image capturing apparatus includes a digital camera constituted by an image capturing device such as a CCD. The image capturing apparatus obtains image data by capturing a still image or a video. The image capturing apparatus detects a brightness of the environment in which the transmitter is located. The image capturing apparatus may have a light that is lit in a case where the brightness is below a predetermined brightness. It is, however, to be noted that the transmitter and the receiver are not limited to the hardware configurations described above. The transmitter and the receiver may include circuits and other suitable hardware configurations that can implement the various functions described below.

Figure 2:
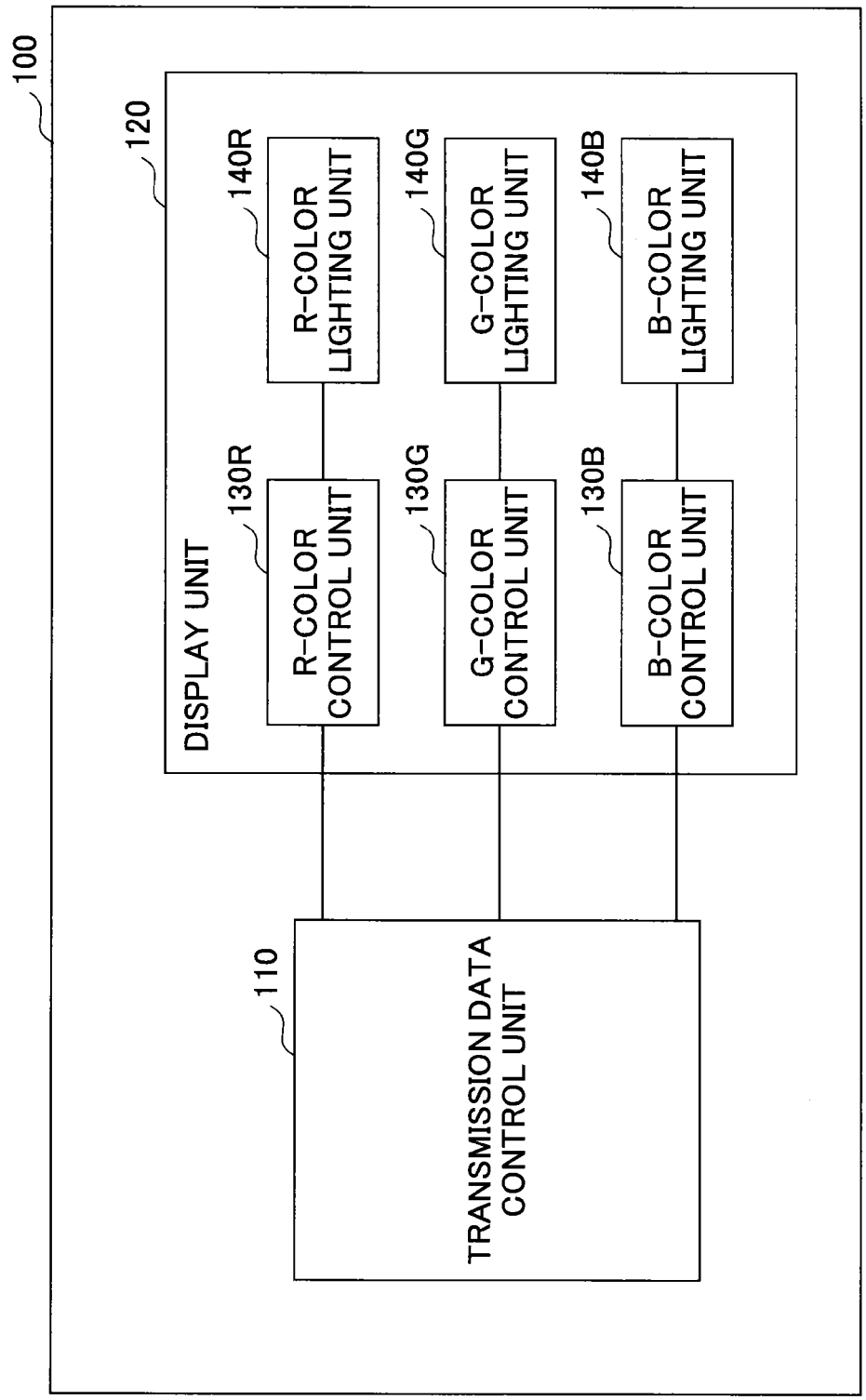
FIG. 2 is a block diagram illustrating a configuration of a transmitter according to an embodiment of the present invention.

Next, the transmitter according to an embodiment of the present invention is described with reference to FIG. 2. FIG. 2 is a block diagram illustrating a configuration of the transmitter according to an embodiment of the present invention.

As illustrated in FIG. 2, a transmitter 100 includes a transmission data control unit 110 and a display unit 120. The display unit 120 includes an R-color control unit 130R, a G-color control unit 130G, and a B-color control unit 130B along with a corresponding R-color lighting unit 140R, a corresponding G-color lighting unit 140G, and a corresponding B-color lighting unit 140B.

The transmission data control unit 110 distributes target transmission data to each color of RGB. In a case of modulating each color by using two color values "255" and "0" as described above, the transmission data control unit 110 may, for example, distribute "$x_0 x_3 \ldots x_n$" of target transmission data "$x_0 x_1 x_2 \ldots x_n x_{n+1} x_{n+2}$" to the R-color control unit 130R, "$x_1 x_4 \ldots x_{n+1}$" of target transmission data "$x_0 x_1 x_2 \ldots x_n x_{n+1} x_{n+2}$" to the G-color control unit 130G, and "$x_2 x_5 \ldots x_{n+2}$" of target transmission data "$x_0 x_1 x_2 \ldots x_n x_{n+1} x_{n+2}$" to the B-color control unit 130B (however, note that "$x_i$" is a binary value of "0" or "1"). Further, according to another embodiment, one of the three colors of RGB may be allocated for transmitting the below-described synchronization signal, and target transmission data may be transmitted by using the remaining two colors. The above-described distribution method is merely an example. Other suitable distribution methods may be used. For example, target transmission data may be serially divided into 3 parts and distributed to corresponding colors of RGB.

Further, the transmission data control part 110 may add a bit string including a preamble or an error detection/correction code to data to be distributed to each color of RGB, so that the receiver 200 can receive the data more reliably.

The display unit 120 converts the target transmission data received from the transmission data control part 110 into one or more transmission images, and displays a video on a communication area of a display of the transmitter 100. Although the transmission image may be displayed in any suitable shape, the transmission image is preferred to be displayed in a shape suitable for being read by the receiver 200. For example, it is not preferable for the transmission image to have a shape that prevents the receiver 200 from suitably recognizing the transmission image depending on the read angle during the capturing of the display of the transmitter 100.

In a case of transmitting the bit string of the target transmission data ""$x_0 x_1 x_2 \ldots x_n x_{n+1} x_{n+2}$" by using the two color values of "255" and "0" for each of the above-described colors, the R-color control part 130R allocates the color value "0" to "$x_0 x_3 \ldots x_n$" provided from the transmission data control part 110 in a case where $x_i$="0" and allocates the color value "255" to "$x_0 x_3 \ldots x_n$" provided from the transmission data control part 110 in a case where $x_i$="1" and controls the R-color lighting unit 140R to light in accordance with the color sequence "0/255 . . . " corresponding to "$x_0 x_3 \ldots x_n$". Similarly, the G-color control part 130G allocates the color value "0" to "$x_1 x_4 \ldots x_{n+1}$" provided from the transmission data control part 110 in a case where $x_i$="0" and allocates the color value "255" to "$x_1 x_4 \ldots x_{n+1}$" provided from the transmission data control part 110 in a case where $x_i$="1" and controls the G-color lighting unit 140G to light in accordance with the color sequence "0/255 . . . " corresponding to "$x_1 x_4 \ldots x_{n+1}$".

Further, the B-color control part 130B allocates the color value "0" to "$x_2 x_5 \ldots x_{n+2}$" provided from the transmission data control part 110 in a case where $x_i$="0" and allocates the color value "255" to "$x_2 x_5 \ldots x_{n+2}$" provided from the transmission data control part 110 in a case where $x_i$="1" and controls the B-color lighting unit 140B to light in accordance with the color sequence "0/255 . . . " corresponding to "$x_2 x_5 \ldots x_{n+2}$".

Each of the R-color lighting unit 140R, the G-color lighting unit 140G, and the B-color lighting unit 140B lights a display in each display frame in accordance with a color sequence under the controls of corresponding R-color control unit 130R, G-color control unit 130G, and B-color control unit 130B. In this embodiment, because two color values "0" and "255" are used with respect to each color of RGB, the bit strings of the target transmission data are converted to blinking patterns of each color.

Figure 3:
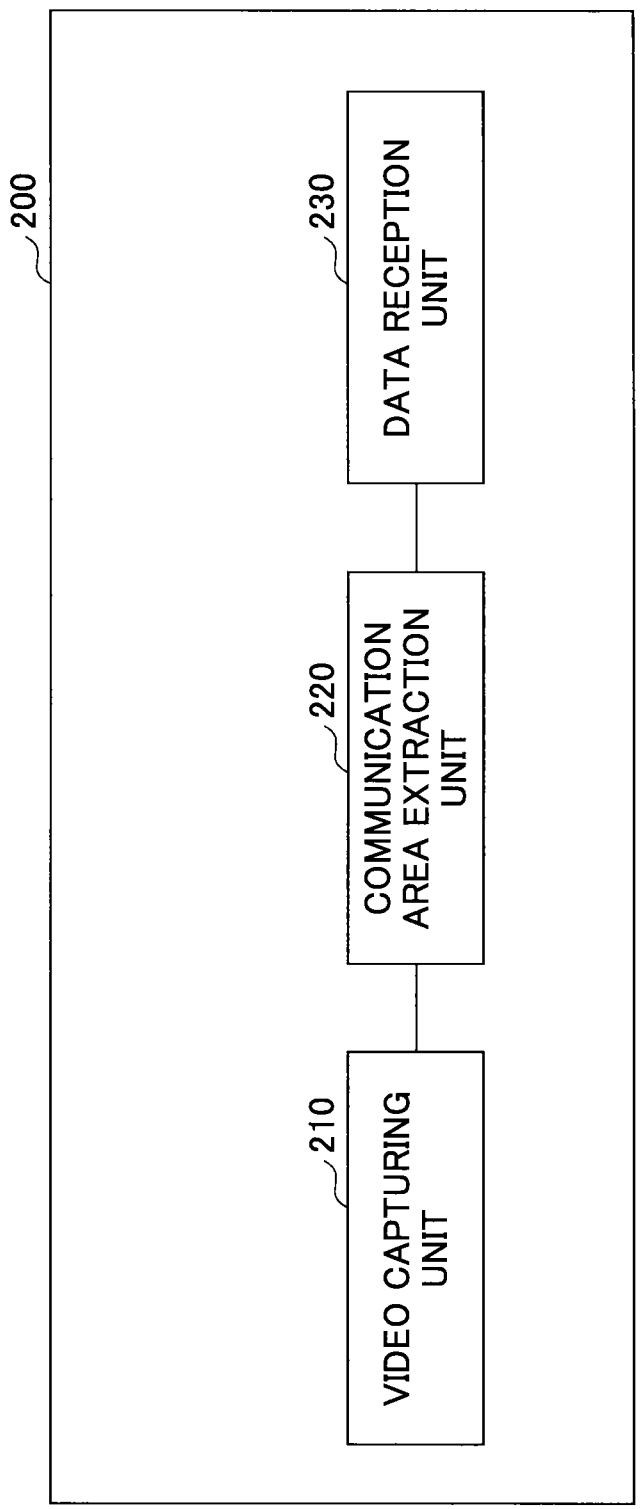
FIG. 3 is a block diagram illustrating a configuration of a receiving according to an embodiment of the present invention.

Next, the receiver according to an embodiment of the present invention is described with reference to FIG. 3. FIG. 3 is a block diagram illustrating a configuration of the receiver according to an embodiment of the present invention.

As illustrated in FIG. 3, the receiver 200 includes a video capturing unit 210, a communication area extraction unit 220, and a data reception unit 230.

The video capturing unit 210 captures a video constituted by one or more transmission images displayed on the display of the transmitter 100 and provides one or more captured images constituting the captured video to the communication area extraction unit 220. In a case where the transmitter 100 displays a transmission image as illustrated in FIG. 1 on a display, the captured image is, typically, an image that includes a main body of the transmitter 100 as illustrated in FIG. 1.

The communication area extraction unit 220 extracts a communication area of target transmission image of the transmitter 100 from the one or more captured images provided from the video capturing unit 210 and provides the extracted communication area to the data reception unit 230. In a case where the captured image is an image including a main body of the transmitter 100 as illustrated in FIG. 1, the communication area extraction unit 220 extracts a colored communication area at a center of the transmission data from the captured image.

The communication area extraction unit 220 may extract the communication area based on a shape of the communication area displayed on the display of the transmitter 100. However, depending on the angle in which the display of the transmitter 100 is captured by the receiver 200, it is possible that the shape of the communication area cannot be properly captured. Therefore, it is preferable to use the below-described method using a single predetermined color as a synchronization signal, so that the shape of the communication area can be properly recognized.

Further, the receiver 200 may simultaneously capture displays of multiple transmitters 100. In this case, the communication area extraction unit extracts a communication area of each transmitter 100 from the captured image and provides the multiple extracted communication areas to the data reception unit 230. Thereby, the receiver 200 can simultaneously receive data such as profile data from multiple transmitters 100. Thus, compared to performing one-to-one communication by using, for example, a conventional infrared communication, a more efficient one-to-many communication can be performed between communication terminals.

Figure 4:
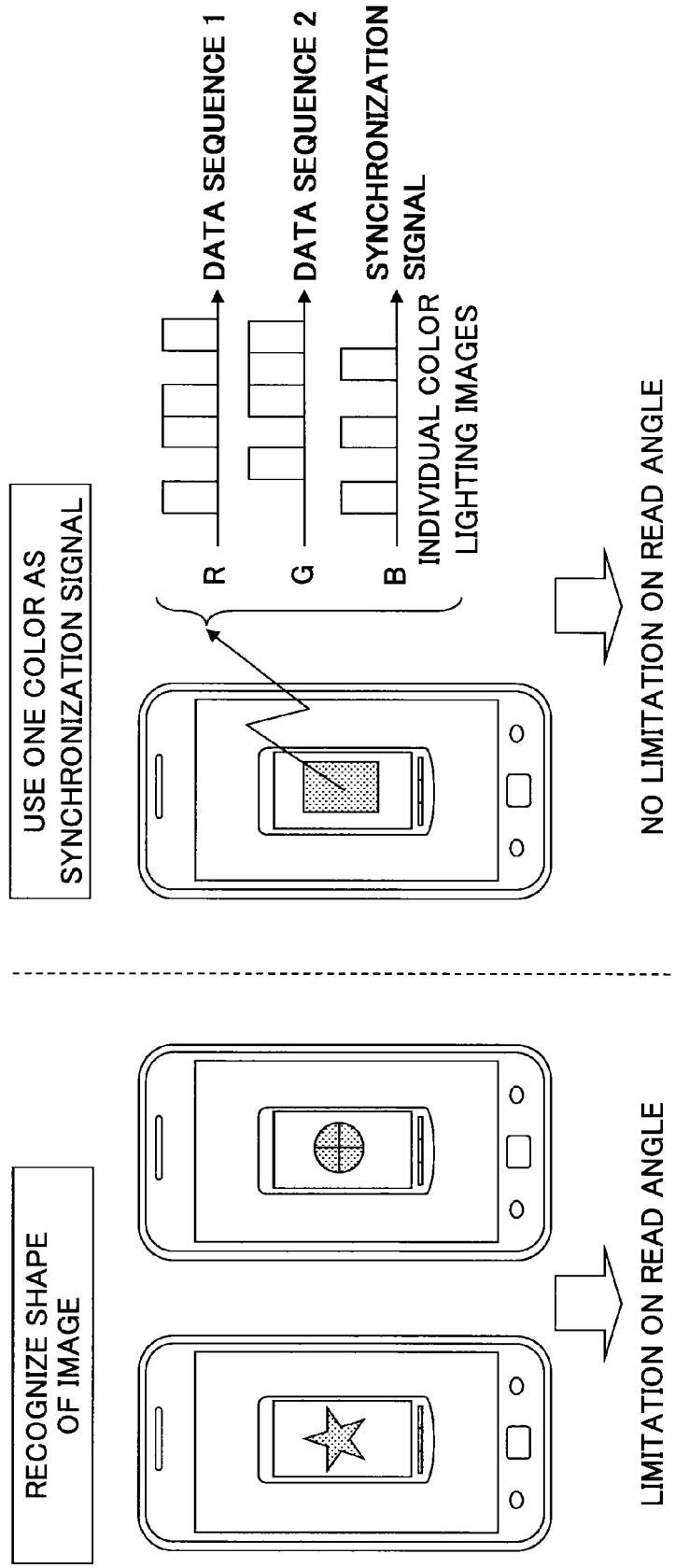
FIG. 4 is a diagram illustrating a method for identifying a communication area according to an embodiment of the present invention.

Further, in a preferred embodiment as illustrated in FIG. 4, the transmitter 100 may allocate a single predetermined color from one of the three colors of RGB as a synchronization signal for identifying the communication area, and the communication area extraction unit 220 may extract the communication area by using the synchronization signal. In the embodiment illustrated in FIG. 4, blue is allocated as a synchronization signal, and the transmitter 100 may display a communication area within a blue demarcation line. By identifying a blue demarcation line within a captured image, an area encompassed by the identified demarcation line can be extracted as the communication area by the communication area extraction unit 220. Alternatively, the transmitter 100 may display a synchronization signal of blue on an entire communication area in a manner superposing the other colors. By identifying a blue color component within a captured image, the communication area can be extracted by the communication area extraction unit 220. More preferably, as illustrated in FIG. 4, the transmitter 100 may cause a color allocated as a synchronization signal to blink according to a predetermined blinking pattern. In this case, the communication area extraction unit 220 can identify the communication area with higher accuracy. This is particularly effective in a case of extracting multiple communication areas such as the above-described one-to-many communication.

The data reception unit 230 identifies a color value sequence of each color of RGB in the communication area received from the communication area extraction unit 220 and identifies a bit string included in the communication area from the identified color value sequence. For example, in a case where a communication area is constructed by using two color value "0" and "255" with respect to each color of RGB, information of 3 bits can be obtained from a single captured image. Thus, the data reception unit 230 constructs transmitted information from a captured video by obtaining information of 3 bits from each captured image and combining the obtained information.

Figure 5:
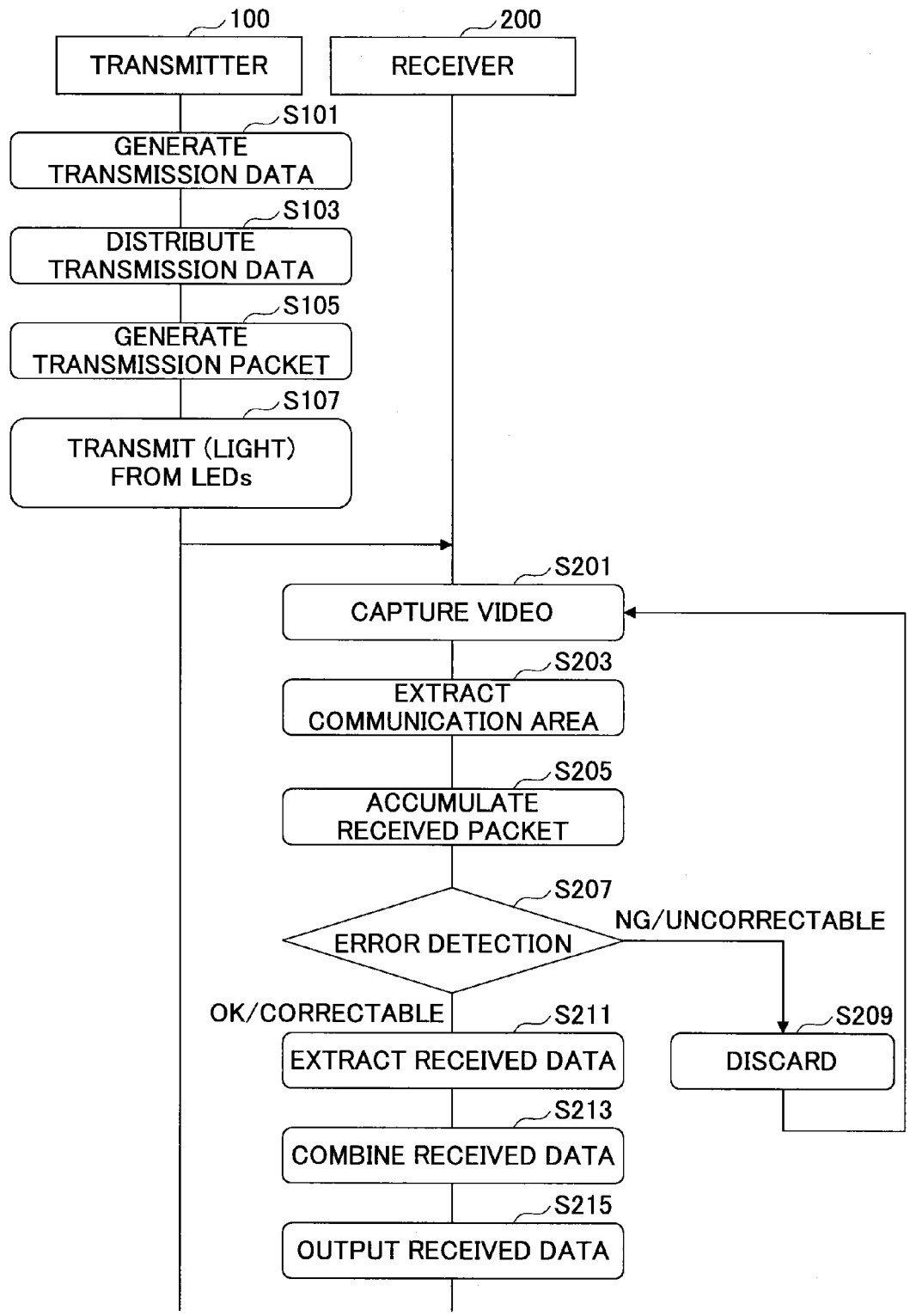
FIG. 5 is a flowchart illustrating processes of a transmitter and a receiver according to an embodiment of the present invention.

Next, processes of transmitting data from the transmitter to the receiver according to an embodiment of the present invention is described with reference to FIG. 5. FIG. 5 is a flowchart illustrating processes of the transmitter and the receiver according to an embodiment of the present invention.

As illustrated in FIG. 5, in Step S101, the flow begins by the generation of transmission data at the transmitter 100. Typically, in a case where a user of the transmitter 100 desires to transmit data such as profile data of the user itself to the receiver 200 via a display, the flow is started.

In Step S103, the transmitter 100 distributes target transmission data to each color of RGB. Alternatively, in a case of allocating one color among RGB as a synchronization signal, the transmitter 100 distributes target transmission data to the remaining two colors.

Figure 6:
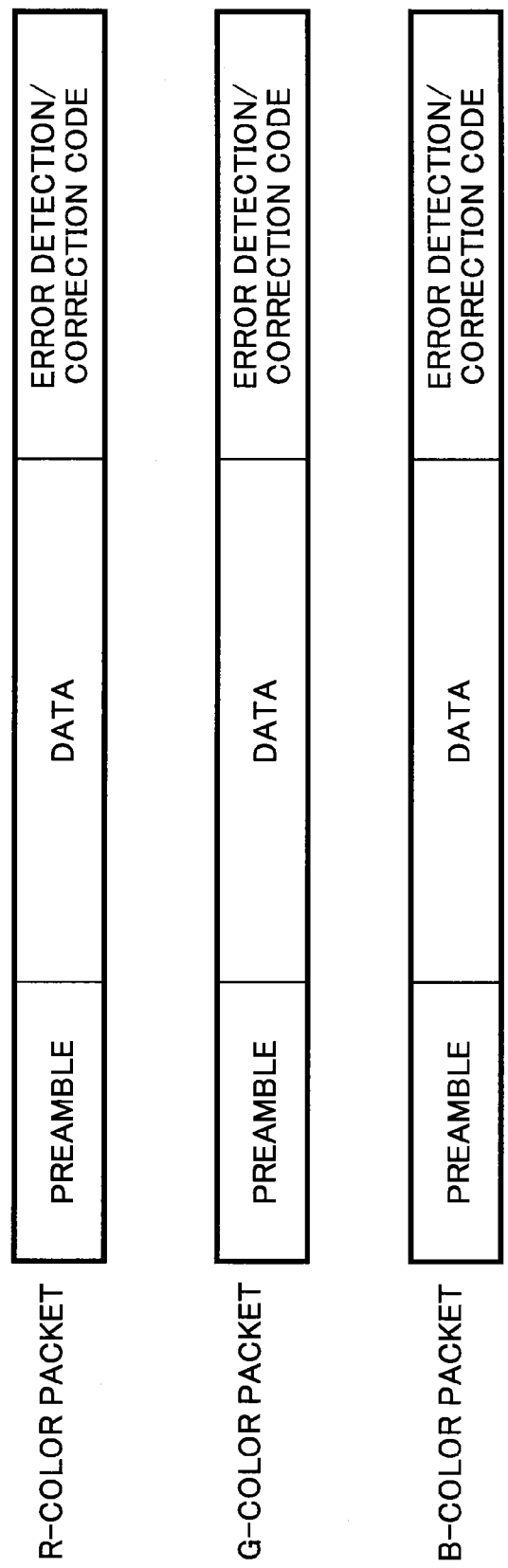
FIG. 6 is a diagram illustrating a packet configuration according to an embodiment of the present invention.

In Step S105, the transmitter 100 adds a preamble and an error detection/correction code to the data distributed to each color of RGB and generates a packet for each color of RGB as illustrated in FIG. 6. The added preamble and error detection/correction code may be formed using any known technology. By adding such data, packets can be positively received by the receiver 200.

In Step S107, the transmitter 100 converts bit sequences including an R-color packet, G-color packet, and a B-color packet into color value sequences, and lights a display typically constituted by an LED.

In Step S201, the receiver 200 captures a video displayed on the transmitter 100 and obtains the captured video.

In Step S203, the receiver 200 extracts a communication area from each captured image included in the captured video.

In Step S205, the receiver 200 accumulates image data of the communication area extracted from each captured image into a storage unit.

In Step S207, the receiver 200 performs error detection on each packet based on the error detection/correction code of the packet of each color of the stored image data. In a case where an error is detected in a packet but cannot be corrected (Step S207: NG/Uncorrectable), the receiver 200 discards the packet (Step S209) and returns to Step S201 where a video is re-obtained from the transmitter 100. On the other hand, in a case where no error is detected in a packet or in a case where an error is detected but is correctable, the receiver 200 extracts a data part from an accumulated packet of each color.

In Step S213, the receiver 200 combines the data extracted from the packet of each color to reconstruct the data transmitted from the transmitter 100.

In Step S215, the receiver 200 outputs the reconstructed data to the storage unit and/or a display.

Figure 7:
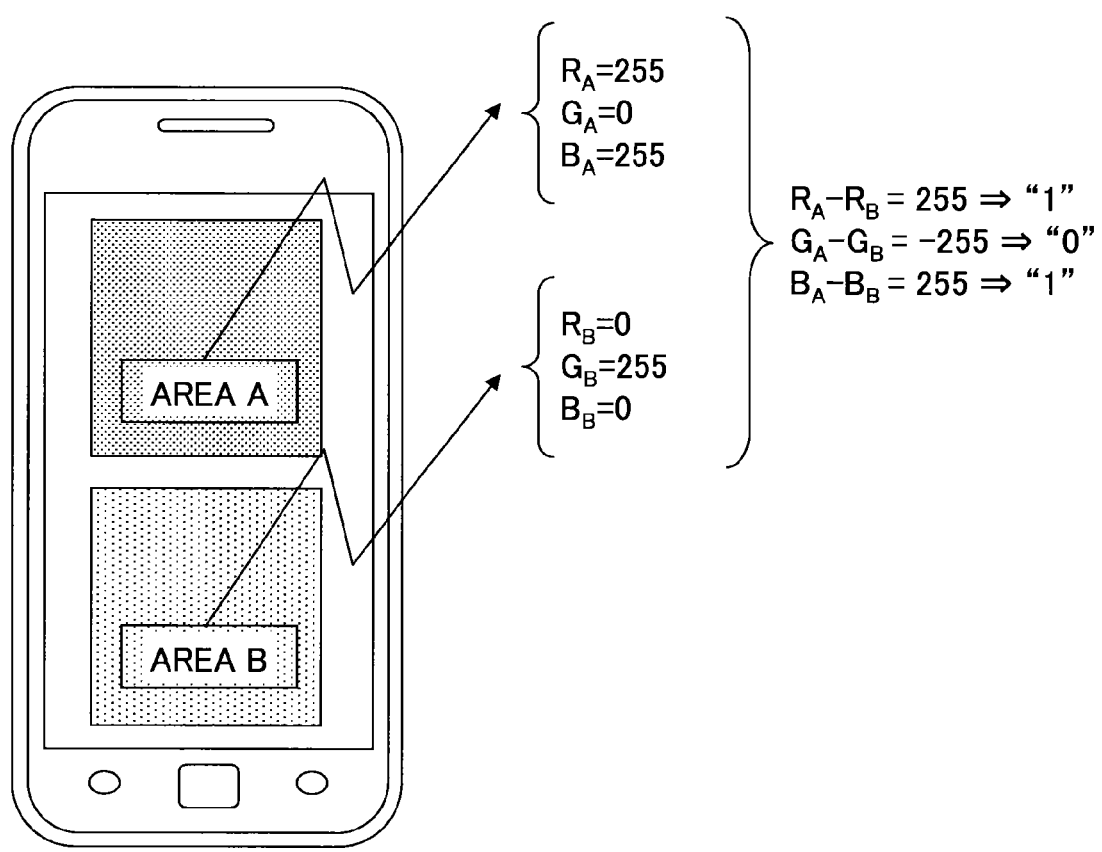
FIG. 7 is a diagram illustrating a transmission image according to another embodiment of the present invention.

Next, an example of transmitting information with a color image according to another embodiment of the present invention is described with reference to FIG. 7. FIG. 7 is a diagram illustrating a transmission image according to another embodiment of the present invention.

In this embodiment, the transmitter 100 displays two communication areas A, B on a display and transmit target transmission data according to a color difference between the color images displayed in corresponding communication areas A, B as illustrated in FIG. 7. According to the illustrated embodiment, each color of RGB is displayed with corresponding color values "255", "0", and "255" in the communication area A whereas each color of RGB is displayed with corresponding color values "0", "255", and "0" in the communication area B. The color difference between the two color images is "255", "−255", and "255" for each color of RGB. By allocating a color difference value "255" to bit value "1" and allocating a color difference value "−255" to bit value "0", the transmitter 100 can transmit information of 3 bits "101" by using the two communication areas A, B.

Although two color values "255" and "0" are used for each primary color in the illustrated transmission image, a multi-value modulation method using more color values may be used. For example, 4 color values "255", "170", "85", and "0" may be used. In this case, corresponding four color difference values are "255", "85", "−85", and "−255", respectively. Further, the color difference value "255" is allocated to a binary value "11", the color difference value "85" is allocated to a binary value "10", the color difference value "−85" is allocated to a binary value "01", and the color difference value "−255" is allocated to a binary value "00". In this case, 6 bit information can be transmitted with a single transmission image by using the three primary colors of RGB.

In this embodiment, even in a case where a color received by a camera is significantly different from its initial color due to influence of ambient light, the influence of ambient light can be reduced compared to the embodiment of using only a single communication area by lighting two communication areas as a single pair and obtaining their difference.

Next, an expected effect of the present invention is described with reference to FIG. 8. FIG. 8 is a diagram illustrating an effect according to an embodiment of present invention.

The calculation values illustrated in FIG. 8 indicate the theoretical values of time required for transmitting an IPv4 address (32 bits) under the same frame rate (30 frames per second). In the first row of the illustrated table, the calculation results of a conventional method of transmitting information with a single color is illustrated, and it is shown that 2.13 second is required for transmitting the IPv4 address. On the other hand, the calculation results of the present invention that transmit information with color images are shown in the second to fifth rows of the illustrated table. With any of these methods of the present invention, it can be understood that information can be transmitted in a shorter time compared to the conventional method.

Further, the present invention is not limited to these embodiments, but various variations and modifications may be made without departing from the scope of the present invention.

The present application is based on and claims the benefit of priority of Japanese Patent Application No. 2011-257798, filed on Nov. 25, 2011, the entire contents of the Japanese application are hereby incorporated by reference.

LIST OF REFERENCE SYMBOLS

100: transmitter
110: transmission data control unit
120: display unit
200: receiver
210: video capturing unit
220: communication area extraction unit
230: data reception unit

The invention claimed is:

1. A transmitter for transmitting target data by video, the transmitter comprising:
   transmission data control circuitry configured to
      allocate a single color of a plurality of colors for transmitting a synchronization signal;
      retrieve the target data to be transmitted by the transmitter; and
      distribute the target data to a plurality of color value differences constituting the video; and
   display circuitry configured to
      set a plurality of communication areas for displaying a plurality of videos on a screen;
      convert the distributed target data into a sequence of predetermined color value differences between the plurality of communication areas with respect to colors displayed in videos in the plurality of communication areas;
      light the allocated color to identify the plurality of communication areas; and
      light colors in the plurality of communication areas on the screen in accordance with the sequence of the color value differences to communicate the target data based on differences between color values in the plurality of communication areas over a predetermined period of time.

2. A receiver for receiving the target data from the transmitter claimed in claim 1, the receiver comprising:
   video capturing circuitry configured to capture the screen of the transmitter;
   communication area extraction circuitry configured to extract the plurality of communication areas from data displayed on the captured screen; and
   data reception circuitry configured to obtain the target data by obtaining sequences of differences in color values displayed in the extracted plurality of communication areas and combine the obtained sequences of differences in color values.

3. A method for transmitting target data by video, the method comprising:
- allocating, by a transmitter, a single color of a plurality of colors for transmitting a synchronization signal;
- retrieving, by the transmitter, the target data to be transmitted;
- distributing, by the transmitter, the target data to a plurality of color value differences constituting the video;
- setting, by the transmitter, a plurality of communication areas for displaying a plurality of videos on a screen;
- converting, by the transmitter, the distributed target data into a sequence of predetermined color value differences between the plurality of communication areas with respect to colors displayed in videos in the plurality of communication areas;
- lighting, by the transmitter, the allocated color to identify the plurality of communication areas; and
- lighting colors in the plurality of communication areas on the screen in accordance with the sequence of the color value differences to communicate the target data based on differences between color values in the plurality of communication areas over a predetermined period of time.

4. The method of claim 3, further comprising:
capturing, with a receiver, the screen of the transmitter.

5. The method of claim 4, further comprising:
extracting, with the receiver, the plurality of communication areas on which the video is displayed from data displayed on the captured screen.

6. The method of claim 5, further comprising:
obtaining the target data by obtaining sequences of differences in color values from the video displayed in the extracted plurality of communication areas and combining the obtained sequences of differences in color values.

* * * * *